Jan. 17, 1939.   B. G. MORELAND   2,144,164
CLAMP
Filed April 20, 1936
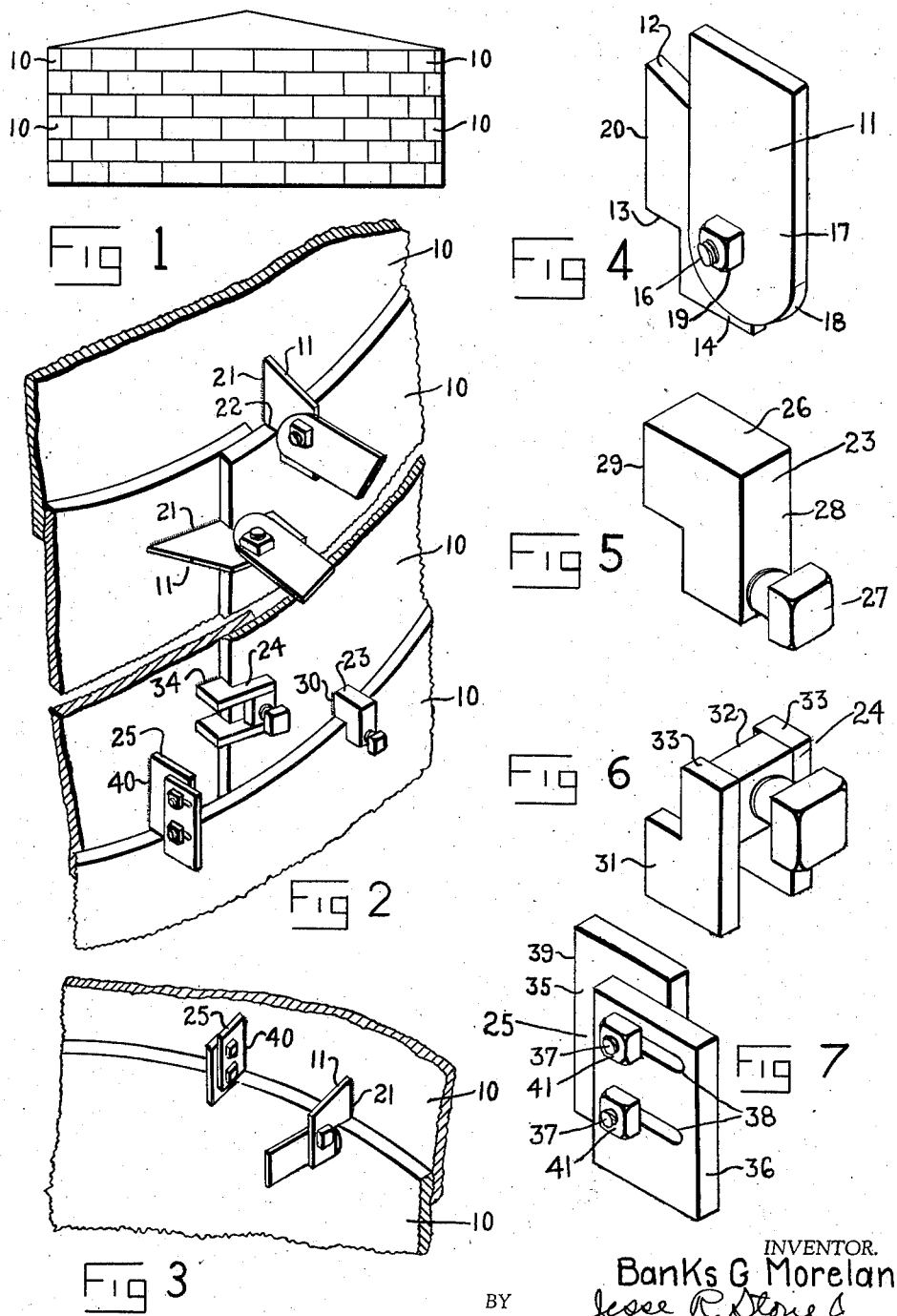
INVENTOR.
Banks G. Moreland
BY
Jesse R. Stone
Lester D. Clark
ATTORNEYS Patented Jan. 17, 1939

2,144,164

UNITED STATES PATENT OFFICE 2,144,164

CLAMP

Banks G. Moreland, Houston, Tex.

Application April 20, 1936, Serial No. 75,319

1 Claim. (Cl. 113—99)

This invention relates to clamps for securing the plates of a sheet metal structure together preparatory to the welding of the joints between the plates.

One object of the invention is to provide a clamp capable of ready attachment and removal.

A second object of the invention is to provide a clamp which can be readily and quickly actuated to secure the plates in position for welding.

A third object of the invention is to provide a clamp embodying frictional means for locking the clamping member against retrogressive movement.

A fourth object of the invention is to provide a clamp of strong and durable character.

Other objects will appear in the following description, when read in connection with the accompanying drawing, in which:

Fig. 1 is a side elevation view of an oil tank constructed with sheet metal plates.

Fig. 2 is a broken perspective view of a portion of the tank shown in Fig. 1, illustrating the manner in which the construction plates of the tank may be secured together preparatory to welding by clamps of the type contemplated by this invention.

Fig. 3 is a perspective internal view of a portion of the tank illustrated in Fig. 1, illustrating the application of two of the clamps contemplated by this invention.

Fig. 4 is a perspective view of one form of clamp.

Fig. 5 is a perspective view of a second form of clamp.

Fig. 6 is a perspective view of a third form of clamp, and

Fig. 7 is a perspective view of a fourth form of clamp.

The tank illustrated in Fig. 1 of the drawing is constructed of sheet metal plates 10, joined together by welding the overlapping portions of the plates. In the construction of a structure of such type, it is customary to employ rolled plates which are more or less warped, and have to be forced into engagement prior to welding of the joints between the plates. The usual method of construction is to secure the plates in position prior to welding of the joints by means of bolts or other means capable of being employed to force the edges of the plates together.

In accordance with the present invention the construction plates are secured together by means of clamps attached to the construction plates by welding. One type of clamp contemplated is illustrated in Fig. 4, a second in Fig. 5, a third in Fig. 6, and a fourth in Fig. 7.

The manner in which the clamps illustrated in Figs. 4, 5, 6 and 7 are employed to hold the construction plates in position is illustrated in Figs. 2 and 3. It will, of course, be understood that in general only one type of clamp will be used in any one construction, and that the application of the four types have been shown in connection with one construction merely for the purpose of illustration.

The clamp illustrated in Fig. 4 and denoted by the numeral 11, comprises a plate 12 formed with a shoulder 13 and a narrow portion or arm 14. Pivotally mounted upon the arm 14 by means of a bolt 16, there is a lever 17, the shorter arm of which is formed with a cam surface 18 in eccentric relation with the bolt. The bolt 16, itself, is formed with threads such that the friction between the lever 17 and the nut 19 of the bolt tends to tighten the nut as the member 17 is moved outward into clamping position, the object being to prevent the creation of play in clamp during the clamping action.

The clamp 11 is designed for attachment to a construction plate with the edge 20 of the plate 12 abutting the surface of the construction plate, and is secured in place by effecting a weld 21 at one side of the plate 12. The arm 14 of the plate 12 forms with the construction plate a recess 22 which receives the edge of the adjoining construction plate.

In the use of the clamps of the type just described, the construction plates are individually fitted with a number of clamps prior to assembly, the arrangement of the clamps being such as to effect a proper construction. In assemble of the construction plates, the levers 17 of the clamps are set in the position illustrated in Fig. 4, and each plate as added is brought to a position in which its edges extend under the arms 14 of the clamps welded to the adjoining plates, and the edges of the adjoining plates extend under the arms 14 of the clamps carried by such plate. The levers 17 are then turned outward, preferably by a handle construction to fit over the ends of the levers, the cam 18 acting during such movement to force the construction plates into engagement. Upon removal of the actuating force from the handles 17, the cams 18 act to retain the construction plates in engagement, retrogressive movement thereof being prevented by the frictional engagement between such parts and the construction plates. Welding of the joints between the construction plates may directly follow the addition of plates, or may be done after the construction plates are completely assembled. In case the clamps initially fitted on the construction plates are not sufficient to draw the plates into proper position for welding, additional clamps may be added after assembly. After welding of the joints between the construction plates the clamps 11 are removed by simply striking them on the side opposite the edge 21 by means of a hammer or bar.

The clamps illustrated in Figs. 5, 6 and 7 and denoted respectively by the numerals 23, 24 and 25, are employed in the same general manner as the clamp 11, and are removed in the same way following the welding of the joints between the plates.

The clamp 23 comprises a shouldered base part 26 and a screw 27 mounted in the arm 28 of the part 26. Such clamp is mounted in place with the edge 29 of the plate 26, engaging the construction plate by forming a weld 30 at one side thereof, its position being such that the arm 28 extends over the adjoining construction plate. The screw 27 is employed to force the construction plates together and to retain them in such position for welding, and is formed with threads of such pitch that the friction between the threads prevents retrogressive movement. When clamps of such character are secured to a construction plate prior to its erection, it is necessary that the screws 27 be turned to a position in which they do not interfere with the insertion beneath the arm 28 of the edges of the adjoining plates. When such clamps are applied following the erection of the construction plates, the screws 27 must be turned to a position in which they allow the edges 29 of the plates 26 to be completely brought into engagement with the construction plates. The construction plates are secured together through the use of the clamps 23 by turning the screws 27 inwardly to force the plates into engagement.

Clamp 24 differs in construction from the clamp 23 in that the base part 31 instead of being formed of a single member is made up of a nut 32 and two plates 33 welded to the opposite sides of the nut. It is secured in place by forming a weld 34 along the outside edge of one of the plates 33.

The clamp 25 comprises a base plate 35 and a movable plate 36 which extend beyond one edge of the base plate. The plates 35 and 36 are secured together by means of bolts 37 mounted in apertures in the plate 35 and extending through slots 38 in the plate 36. Such clamp is affixed in place with the edge 39 of the plate 35 engaging with the construction plate by forming a weld 40 at one side of the plate 35, the position of the clamp being such that the plate 36 extends over the adjoining construction plate. In the use of clamps of such character, the nuts 41 of the bolts 37 are turned to draw the plates 35 and 36 into tight frictional engagement and the plate 36 driven inward by means of a hammer or other instrument to force the construction plates together.

What is claimed as new is:

A device for securing together adjacent tank plates for welding, including an anchor plate having an edge for welding to the tank plate to be attached, a laterally extending arm on said anchor plate to overhang the adjacent tank plate when said anchor plate is welded in place, a clamping plate of the same thickness as said anchor plate pivoted to said arm, a rounded cam end on said clamping plate adapted to contact with said adjacent tank plate, the other end of said clamping plate extending beyond said pivoted mounting to be engaged by a hammer whereby said cam end may be forced into clamping engagement with said adjacent tank plate for the purpose described.

BANKS G. MORELAND.